(12) United States Patent
Gallert

(10) Patent No.: US 8,519,678 B2
(45) Date of Patent: Aug. 27, 2013

(54) SOLAR BATTERY CHARGING CONTROLLER

(76) Inventor: Scott Kennedy Gallert, Vancouver, WA (US)

( * ) Notice: Subject to any disclaimer, the term of this patent is extended or adjusted under 35 U.S.C. 154(b) by 239 days.

(21) Appl. No.: 13/225,751

(22) Filed: Sep. 6, 2011

(65) Prior Publication Data

US 2013/0057410 A1    Mar. 7, 2013

(51) Int. Cl.
*H02J 7/00* (2006.01)
*H02J 7/16* (2006.01)
*G08B 21/00* (2006.01)

(52) U.S. Cl.
USPC ........... 320/166; 320/167; 320/155; 320/157; 340/636.1; 340/635

(58) Field of Classification Search
USPC .............. 340/636.1, 635, 664; 320/157–159, 320/155, 166–167
See application file for complete search history.

(56) References Cited

U.S. PATENT DOCUMENTS

| | | | |
|---|---|---|---|
| 3,718,849 A * | 2/1973 | Nolan et al. | 322/28 |
| 5,291,562 A * | 3/1994 | Hata | 382/276 |
| 7,166,990 B2 * | 1/2007 | Lo | 320/155 |
| 2001/0026159 A1 * | 10/2001 | Price | 324/509 |
| 2013/0033108 A1 * | 2/2013 | Hidaka | 307/51 |

* cited by examiner

*Primary Examiner* — Steven Lim
*Assistant Examiner* — Omeed Alizada
(74) *Attorney, Agent, or Firm* — Scott Kennedy Gallert

(57) ABSTRACT

Battery charging circuitry is provided. A charge controller receives electrical energy from a photovoltaic panel. A first timer provides a stream of clock pulses. A second timer is triggered by the clock pulses and generates a pulse-width modulated (PWM) signal. A duty cycle of the PWM signal is determined by way of comparing a time-varying capacitor voltage to a signal derived from a storage battery voltage. Transfer of electrical energy from the photovoltaic panel to the storage battery is regulated by a shunting element using the PWM signal.

10 Claims, 4 Drawing Sheets

SOLAR BATTERY CHARGING CONTROLLER

BACKGROUND

A photovoltaic panel generates electrical energy by direct conversion of incident sunlight. The resulting electrical energy can be accumulated in a storage battery. However, it is necessary to regulate the total electrical charge provided to the storage battery so as to protect against excessive voltage and various problems related thereto. The present teachings are directed to the foregoing and other concerns.

BRIEF DESCRIPTION OF THE DRAWINGS

The present embodiments will now be described, by way of example, with reference to the accompanying drawings, in which.

DETAILED DESCRIPTION

Introduction

Systems and circuitry are provided for charging a storage battery or batteries by way of solar power. A charge controller receives electrical energy from a photovoltaic panel. The charge controller is also coupled to a storage battery. A first timer circuit of the charge controller provides a stream of clock pulses in accordance with a time-varying voltage signal across a capacitor. A second timer circuit of the charge controller is triggered by the clock pulses and generates a pulse-width modulated (PWM) signal.

The PWM signal is characterized by a duty cycle determined by comparing the time-varying voltage signal to a voltage signal derived from the storage battery voltage. Transfer of electrical energy from the photovoltaic panel to the storage battery is regulated by a shunting element. The shunting element is controlled by way of the PWM signal.

In one example, an electronic circuit includes a first resistor and a second resistor and a capacitor connected in series circuit arrangement and configured to provide a time-varying signal. The electronic circuit also includes a zener diode and a third resistor connected in series circuit arrangement and configured to provide a voltage signal corresponding to a battery voltage present at an output node. A first timer circuitry is configured to provide clock pulses. A second timer circuitry is configured to provide a pulse width modulated signal by way of comparing the voltage signal to the time-varying signal. The second timer circuitry is triggered by the clock pulses. Further included is a switching element configured to shunt an input node to a ground node in accordance with the pulse-width modulated signal.

In another example, a solar power system includes a photovoltaic panel configured to derive electrical energy by direct conversion of incident solar energy. The system also includes a storage battery configured to store electrical energy. The system additionally includes a charge controller configured to regulate a transfer of electrical energy from the photovoltaic panel to the storage battery. The charge controller includes first timer circuitry configured to provide clock pulses. The charge controller also includes second timer circuitry triggered by the clock pulses and configured to provide a pulse-width modulated signal. The pulse-width modulated signal is provided in accordance with a comparison of a time-varying capacitor voltage and a voltage derived from the storage battery.

Illustrative System

Figure 1:
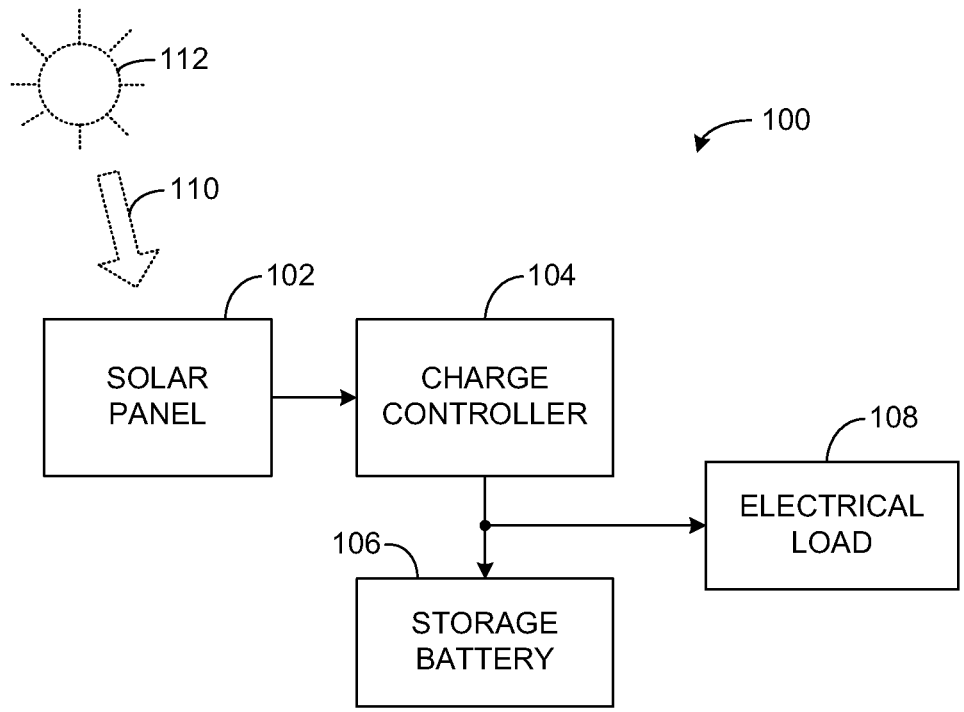
FIG. 1 depicts a block diagram of a solar energy system in accordance with the present teachings.

Reference is now made to FIG. 1, which depicts a block diagram of a system 100 according to the present teachings. The system 100 is illustrative and non-limiting with respect to the present teachings. Other systems, devices and their respective constituencies can also be used. The system 100 is also referred to as a solar energy system 100 for purposes herein.

The system 100 includes a solar panel 102. The solar panel 102 is also referred to as a photovoltaic (PV) panel 102. The solar panel 102 is configured to derive or generate electrical energy by direct conversion of incident photonic energy (e.g., sunlight). In one example, the solar panel 102 is characterized by a peak output power of about fifty watts at about seventeen volts. Other suitable solar panels 102 can also be used.

The system 100 also includes a charge controller 104 in accordance with the present teachings. The charge controller 104 is coupled to receive electrical energy from the solar panel 102 and to provide a regulated flow or transfer of that electrical energy to a storage battery 106. In particular, the charge controller 104 is configured to shunt at least some electrical energy back to the solar panel 102 by way of a switching element. Further description of charge controllers according to the present teachings is provided below.

The system 100 also includes a storage battery 106 as introduced above. The storage battery 106 can be any suitable battery configured to store electrical charge and to release that electrical charge to an electrical load. In one example, the storage battery 106 is a lead-acid type characterized by a nominal voltage of about twelve volts and a storage capacity of about one-hundred amp-hours. Other suitable storage batteries can also be used.

The system 100 further includes an electrical load 108. The electrical load 108 is coupled to receive electrical energy from the storage battery 106. The electrical load 108 can be defined by any suitable device, system or apparatus compatible with the voltage and current capacity of the storage battery 106. Non-limiting examples of the electrical load 108 include a radio transceiver, a global-positioning system (GPS) receiver, a portable computer, a power inverter, a lighting system or other utility of a recreational vehicle, and so on. Other suitable electrical loads can also be used.

Normal typical operations of the system 100 are generally as follows: incident photonic energy 110 from the sun 112 strikes the solar panel 102. Electrical energy, characterized by a voltage and a current are provided from the solar panel 102 to the charge controller 104. In turn, the charge controller 104 regulates a transfer of electrical energy to the storage battery 106. The electrical load 108 draws electrical energy from the storage battery 106 and/or charge controller 104 according to its own respective normal operations. The storage battery 106 can provide electrical energy to the electrical load 108 on a continuous or as-needed basis, while the solar panel 102 and charge controller 104 function to replenish the consumed electrical energy during times of sufficient incident sunlight.

Illustrative Charge Controller

Figure 2:
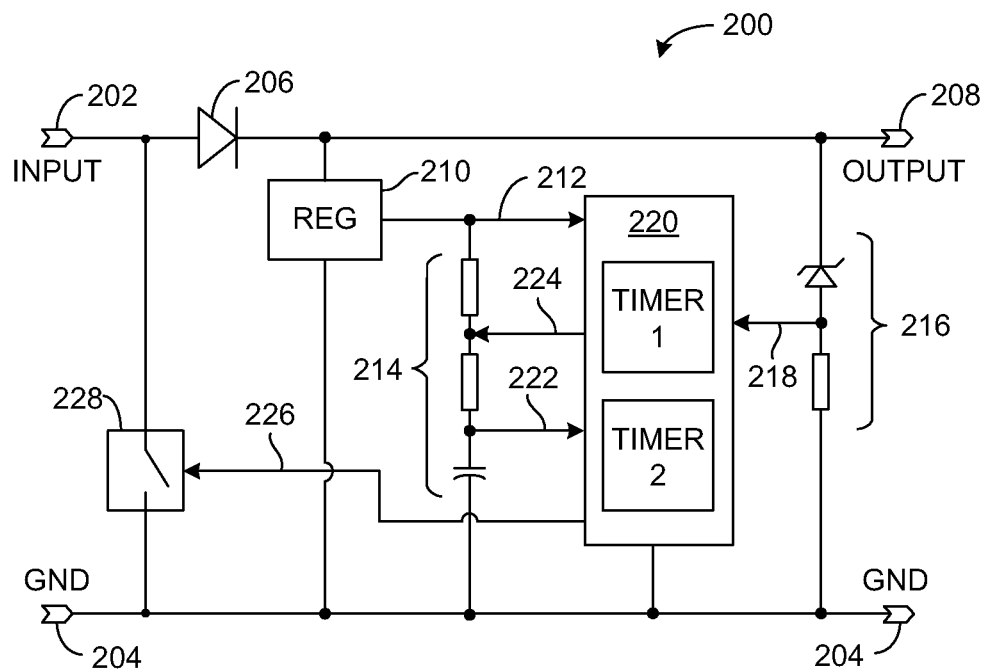
FIG. 2 depicts a schematic block diagram of a charge controller according to the present teachings.

Attention is now turned to FIG. 2, which depicts a schematic block diagram of a charge controller (controller) 200 in accordance with the present teachings. The controller 200 depicts general constituency and principles of operation according to the present teachings. Thus, the controller 200 is illustrative and non-limiting in nature. Other charge controllers having other respectively varying constituencies or functions can also be used. In one example, the charge controller 104 is essentially equivalent to the controller 200.

The controller 200 is defined by an input node 202 and a ground node 204. The input node 202 is configured to be connected or coupled to a positive output node of a solar panel (e.g., 102), while the ground node 204 is configured to connected to a negative output node of the solar panel. The controller also includes a diode 206. The diode 206 can be any suitable diode such as a silicon rectifier diode, a Schottky power diode, and so on. The diode 206 is connected in series circuit arrangement between the input node 202 and an output node 208 of the controller 200. Electrical current flows from the input node 202 to the output node 208 by way of the diode 206 during normal charging operations of the controller 200.

The controller 200 also includes a voltage regulator 210. The voltage regulator 210 is coupled to nodes 204 and 208, respectively, and is configured to provide a regulated output voltage at a node 212. In one example, the voltage regulator 210 is defined by a three-lead linear voltage regulator configured to provide a constant output of about nine volts direct-current (DC). Other suitable voltage regulators can also be used. The controller 200 also includes a timing network 214 defined by a first resistor and a second resistor and a capacitor in series circuit arrangement. The timing network 214 is coupled to electrical energy by way of nodes 212 and 204.

The controller 200 also includes a voltage clipper or limiter circuitry 216 defined by a zener diode and a resistor is series circuit arrangement and coupled between the output node 208 and the ground node 204. The voltage clipper 216 is configured to sense a battery voltage (e.g., 106) present at the output node 208 and to provide a lesser corresponding voltage signal at a node 218. Generally and without limitation, the voltage clipper 216 effectively subtracts a voltage from the battery voltage, providing a resultant difference voltage. In one example, the voltage clipper 216 is configured to subtract about twelve volts DC from the voltage present at node 208 and to provide the difference voltage at the node 218 (with respect to ground node 204). Other embodiments can also be used.

The controller 200 includes an integrated circuit (IC) 220, coupled to nodes 212 and 204, respectively. The IC 220 includes or is defined by two respective timer circuit portions configured to operate as a clock pulse generator and a pulse-width modulated (PWM) signal generator, respectively. In one example, the IC 220 is defined by a model LM556CN Dual Timer, as available from National Semiconductor Corporation, Santa Clara, Calif., USA. Other suitable or equivalent dual-timer integrated circuits can also be used. In another example, the IC 220 is replaced with two discrete timer integrated circuits, such as model NE555P Timer, as available from Texas Instruments Inc., Dallas, Tex., USA.

The IC 220 is coupled to sense the difference voltage at the node 218. IC 220 is also coupled to sense a time-varying signal (voltage) present at node 222, as provided by the timing network 214. Additionally, the IC 220 is coupled to provide a switched or controlled ground (or discharge) signal at a node 224 that is coupled to the timing network 214. The IC 220 is further configured to provide a PWM signal at a node 226 that is coupled to a switch or shunting element 228. The switch 228 is coupled between the input node 202 and the ground node 204.

Normal illustrative operations of the controller 200 are as follows: A solar panel (e.g., 102) is coupled to the input node 202 and the ground node 204. A storage battery (e.g., 106) is coupled to the output node 208 and the ground node 204. Thus, the ground node 204 is common to the solar panel, the charge controller 200 and the storage battery. The voltage regulator 210 functions to provide a regulated (i.e., constant) voltage at the node 212 that is provided to the timing network 214 and to the IC 220.

A first timer circuit of the IC 220 provides an ongoing stream of clock pulses, defining a sequence of equal time periods. In one non-limiting example, each time period is about 0.4 seconds. A second timer circuit of the IC 220 is triggered by the clock pulses and provides the PWM signal at the node 226. Each time period of the PWM signal is defined by an initial shunting phase followed by a charging phase. Specifically, the PWM signal at the node 226 is asserted high at the beginning of each time period and is thereafter asserted (or biased) low in accordance with the duty cycle of that respective time period.

During shunting, the PWM signal at the node 226 is asserted high by the second timer circuit of the IC 220. Electrical current from the input node 202 is shunted (i.e., shorted or "routed back") to the ground node 204 by way of an electrically closed (conductive) state of the switch 228. Essentially zero current flows through the diode 206 during shunting. A voltage at the node 218 that is derived from the storage battery voltage is sensed by the IC 220.

A time-varying voltage at the node 222 increases from a lesser threshold value toward a greater threshold value by way of charging the capacitor of the timing network 214. In one example, the lesser threshold value is about 1.1 volts DC, while the greater threshold value is about 2.2 volts DC. Other suitable respective threshold voltages can also be used.

When the time-varying voltage at the node 222 exceeds the voltage at the node 218, the second timer circuit asserts (or biases) the PWM signal at the node 226 to a low state. The charging phase of the present time period has thus begun. The second timer circuit of the IC 220 maintains the low state of the PWM signal for the remainder of the present time period. In one non-limiting scenario, the voltage at the node 218 is about 1.5 volts DC, derived from a storage battery voltage of about 13.5 volts DC. Other respective voltages can also be used.

During charging, the switch 228 is in an electrically open (non-conductive) state. Electrical current flows from the input node 202 through the diode 206 to the output node 208. Such electrical current (or a portion thereof) charges the storage battery. The timing network 214 continues to charge the capacitor toward the greater threshold value during the charging phase.

Eventually, the time-varying voltage at node 222 reaches the greater threshold value, defining the end of the present time period. The first timer circuit of the IC 220 provides a low-state signal (i.e., zero volts or nearly so) at the node 224. The low signal at node 224 functions to discharge the capacitor through a resistor of the timing network 214 from the greater threshold value to the lower threshold value. The discharge time is relatively brief (e.g., less than one-percent of a time period). The first timer circuit of the IC 220 also issues the next clock pulse during the capacitor discharge.

The second timer circuit of the IC 220 responds to this next clock pulse by asserting the PWM signal high, and the next time period begins. The high state of the PWM signal at the node 226 causes the switch 228 to return to an electrically conductive state. The shunting phase of the next time period is now underway and electrical current is shunted from the input node 202 to the ground node 204.

The shunt/charge cycling of the controller 200 continues in an ongoing manner as described above. The duty cycle of the PWM signal corresponds to the shunting-to-charging ratio of each respective time period. For example, a PWM signal with a forty percent duty cycle corresponds to shunting the electrical current during the first forty percent of each time period and charging the storage battery for the remaining sixty percent of each time period. The PWM signal duty cycle increases in response to increasing storage battery voltage, essentially preventing overcharging.

Illustrative Electronic Circuit

Figure 3:
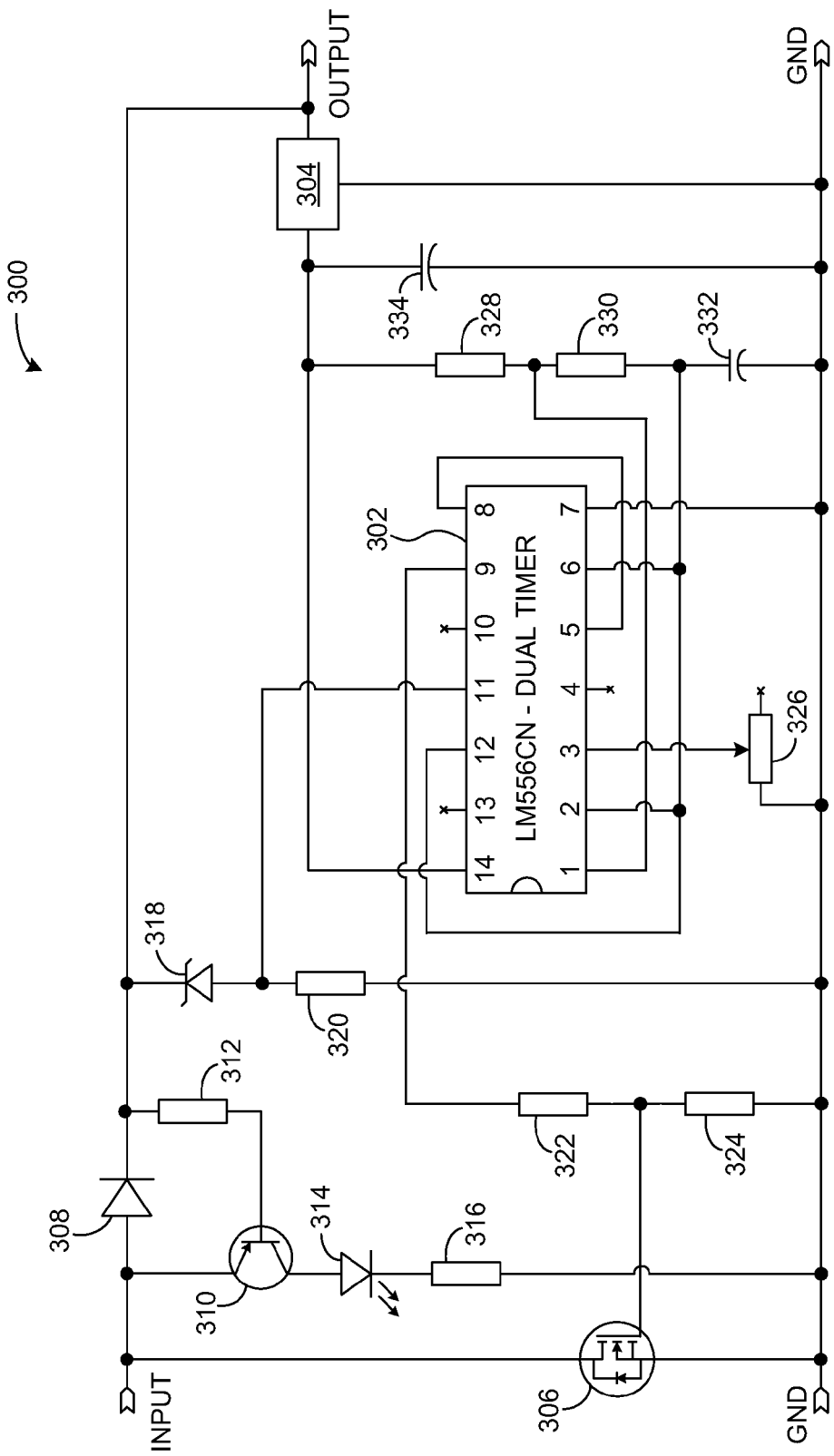
FIG. 3 depicts a schematic diagram of an electronic circuit according to a preferred embodiment of the present teachings.

Attention is now turned to FIG. 3, which depicts a schematic diagram of an electronic circuit (circuit) 300. The circuit 300 is a charge controller according to a preferred embodiment of the present teachings. The circuit 300 is illustrative and non-limiting. The present teachings contemplate any number of other respectively varying circuits. The circuit 300 is configured to be coupled to a solar panel (INPUT node and GND node) and to a storage battery (OUTPUT node and GND node) during typical normal operation.

The circuit 300 includes a dual timer integrated circuit (DTIC) 302. As depicted, the DTIC 302 is a model LM556CN Dual Timer, available from National Semiconductor Corporation. Other suitable or equivalent dual-timer integrated circuits can also be used. The DTIC 302 includes a first timer circuit portion corresponding to pin numbers 1-6 (i.e., 1, 2, 3, 4, 5 and 6), and a second timer circuit portion corresponding to pin numbers 8-13 (i.e., 8, 9, 10, 11, 12 and 13). The DTIC 302 is also configured to be coupled to positive DC voltage at a pin 14 and to ground potential at a pin 7.

The first timer circuit is configured to provide a sequence of clock pulses at pin 5. The second timer circuit is configured to provide a PWM control signal at pin 9. The second timer circuit is also configured to be triggered by the clock pulses at pin 8. Pins 4, 10 and 13 of the DTIC 302 are generally not used within the circuit 300 and are not germane to the present teachings. One having ordinary skill in the electronic and related arts can determine other suitable applications for pins 4, 10 and/or 13, if desired.

The circuit 300 also includes a voltage regulator 304 such as, for non-limiting example, a model KA78L09A nine-volt output linear regulator, available from Fairchild Semiconductor, San Jose, Calif., USA. The voltage regulator 304 is configured to receive electrical energy from a storage battery via the OUTPUT node and to provide a regulated output voltage to pin 14 of the DTIC 302.

The circuit also includes an N-channel power metal-oxide semiconductor field-effect transistor (MOSFET) 306. The MOSFET 306 is configured to act as a switch coupled between the INPUT node and the ground (GND) node, in accordance with a PWM signal provided by the second timer circuit of the DTIC 302. The MOSFET 306 therefore operates as a controllable shunting element.

The circuit further includes a diode 308. The diode 308 is connected between the INPUT node and the OUTPUT node. The diode 308 can be defined by, without limitation, a silicon rectifier diode, a Schottky diode, and so on. In one example, the diode 308 is a silicon rectifier diode having a forward current capacity of 6 amps DC. Other suitable diodes can also be used. The diode 308 is configured to provide one-way electrical current flow (conventional) from the INPUT node to the OUTPUT node during storage battery charging.

The circuit 300 also includes an indicator circuit (or circuitry) including a transistor 310 and a resistor 312 and a light-emitting diode (LED) 314 and a resistor 316. The transistor 310 is forward biased by way of the resistor 312 when current flows through the diode 308, in turn illuminating the LED 314. Thus, the LED 314 provides a visual indication of current flow from the INPUT to the OUTPUT during storage battery charging. Conversely, the LED 314 is not illuminated during shunting operations.

The circuit 300 includes a voltage subtractor including a zener diode 318 and a resistor 320 in series circuit arrangement. The voltage subtractor is configured to provide a lesser voltage derived from a greater battery voltage to pin 11 of the DTIC 302. In one example, the voltage provided to pin 11 of the DTIC 302 is about twelve volts less than a battery voltage present at the OUTPUT node. Other configurations can also be used.

The circuit 300 includes a voltage divider including a resistor 322 and a resistor 324 in a series circuit arrangement. The voltage divider is configured to couple a PWM control signal from pin 9 of the DTIC 302 to the MOSFET 306. The voltage divider is also configured to pull the MOSFET 306 gate node toward ground potential when the PWM signal at pin 9 is not asserted high.

The circuit 300 also includes a potentiometer (pot) 326. One end of the pot 326 is coupled to the GND node, while the wiper is connected to pin 3 of the DTIC 302. An upper threshold voltage, as used by the first timer circuit portion of the DTIC 302, is adjustable by way of the pot 326. In one example, the pot 326 is adjusted to establish an upper threshold voltage of about 2.2 volts DC at pin 3. Other greater threshold voltages can also be used. A lesser threshold voltage equal to about one-half of the greater threshold voltage is derived by internal circuitry of the DTIC 302.

The circuit 300 includes a timing network including a resistor 328 and a resistor 330 and a capacitor 332. The timing network is also coupled to the output voltage provided by the voltage regulator 304. The DTIC 302 is coupled to sense a time-varying signal (voltage) across the capacitor 332 at pins 2, 6 and 12. It is noted that both the first timer circuit and the second timer circuit of the DTIC 302 function respectively in accordance with the time-varying signal across the capacitor 332. Thus, a single timing network is used in providing the clock pulses at pin 5 and the PWM signal at pin 9.

The DTIC 302 senses the time-varying signal while the capacitor 332 charges from the lesser threshold voltage to the greater threshold voltage by way of the resistors 328 and 330. The DTIC 302 then discharges the capacitor 332 from the greater threshold voltage back to the lesser threshold voltage using a discharge signal issued at pin 1. The discharge circuit pathway includes the resistor 330.

The circuit 300 further includes a capacitor 334, configured to reduce ripple or noise at the output of the voltage regulator 304. The capacitor 334 generally functions to stabilize the output of the voltage regulator 304.

The DTIC 302 is provided as a single integrated circuit device. However, other embodiments are contemplated in which the first timer circuit function (pins 1-6) and the second timer circuit function (pins 8-13) are provided by way of respective, discrete integrated circuits. In one example, each such timer is defined by a model NE555P Timer.

Figure 4:
FIG. 4 depicts a table of illustrative constituents in accordance with the electronic circuit of FIG. 3.

Reference is now made to FIG. 4, which depicts a table 400. The table 400 cites specific models, electrical characteristics and/or sources for elements of the circuit 300. Other embodiments of charge controller circuitry having other respectively varying constituencies can also be used.

Illustrative Signal Diagrams

Figure 5:
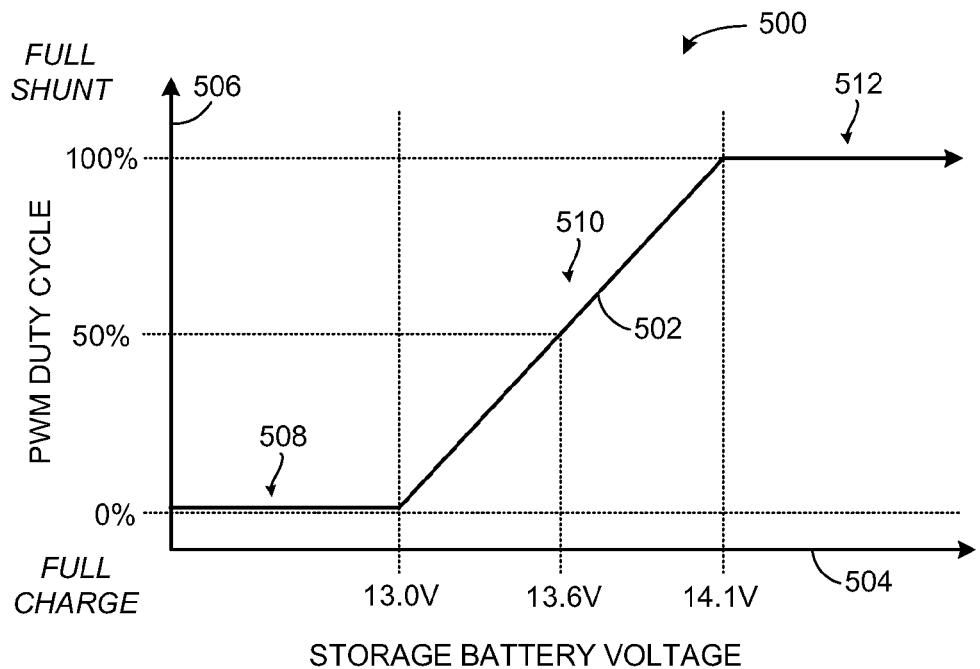
FIG. 5 depicts a signal diagram according to one example of the present teachings.

Reference is directed to FIG. 5, which depicts a signal diagram 500 according to one example of the present teachings. The signal diagram 500 is illustrative and non-limiting in nature. The present teachings contemplate other embodiments or operations corresponding to other signal diagrams.

The signal diagram 500 includes a response curve 502 for an illustrative charge controller according to the present teachings. Specifically, the response curve 502 depicts a relationship between a storage battery voltage 504 and a duty cycle of a PWM signal 506. The response curve 502 is general and linearized in nature, in the interest of clarity and understanding. It is to be understood that other response curves having other respectively varying characteristics are also contemplated.

The response curve 502 includes a first portion 508, in which the storage battery voltage 504 is less than 13.0 volts DC. The PWM signal 506, which is used to drive or control a shunting element, is at nearly zero percent duty cycle within the portion 508, corresponding to charging the storage battery for nearly all of each time period.

The response curve 502 also includes a second portion 510, in which the storage battery voltage 504 increases linearly from about 13.0 volts to about 14.1 volts. In response, the PWM signal 506 increases linearly from nearly zero percent duty cycle to about one-hundred percent duty cycle. The second portion 510 corresponds to an increase in the shunting fraction of each time period as the storage battery voltage 504 increases.

The response curve 502 further includes a third portion 512, in which the storage battery voltage 504 is greater than about 14.1 volts. The PWM signal 506 is at about one-hundred percent duty cycle corresponding to shunting electrical energy back to the source solar panel for about all of each time period.

The response curve 502 overall depicts charging a storage battery (e.g., 106) in accordance with a throttling range of about 13.0 volts to about 14.1 volts. Other throttling ranges are also contemplated. It is noted that the particular throttling range used by the circuit 300 can be varied by way of adjustment of the potentiometer 326.

Figure 6:
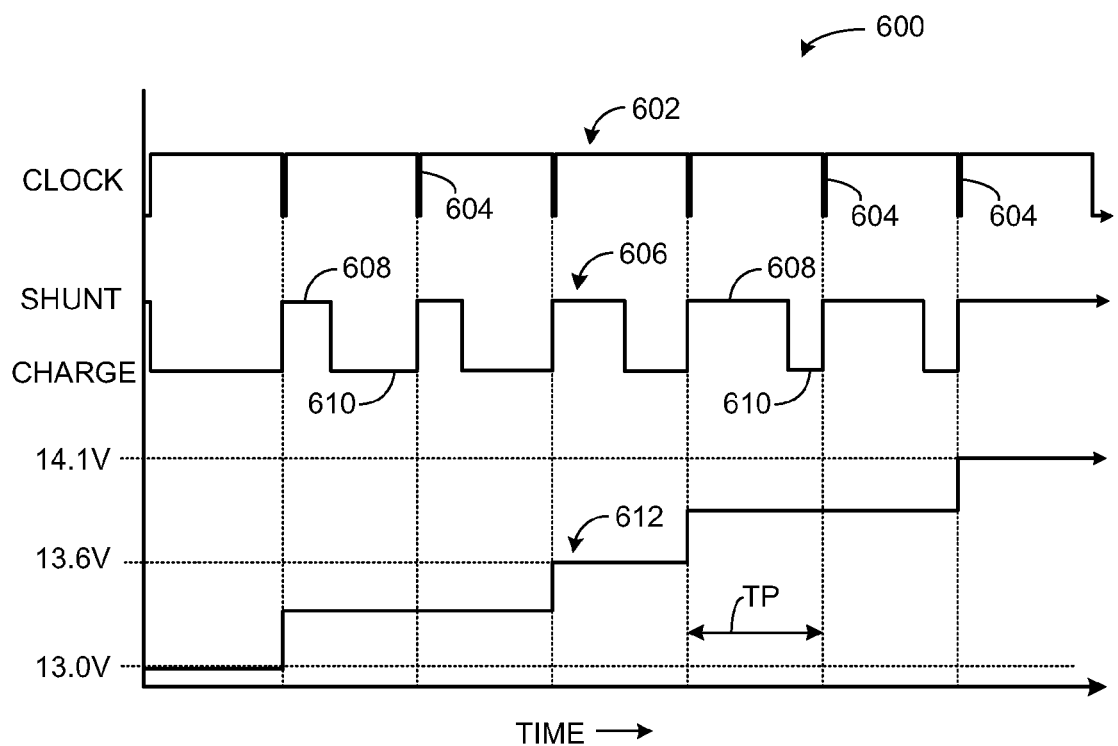
FIG. 6 depicts a signal timing diagram according to one example of the present teachings.

Attention is now turned to FIG. 6, which depicts a signal timing diagram 600 according to one example of the present teachings. The signal timing diagram (diagram) 600 is illustrative and non-limiting in nature. The present teachings contemplate other embodiments or operations corresponding to other signal timing diagrams.

The diagram 600 includes a clock signal 602. The clock signal 602 is defined by negative-going pulses 604 issued at regular intervals so as to define a sequence of equal time periods "TP". Each clock pulse 604 defines the end of a prior time period TP and the beginning of a next time period TP. In one example, the first timer circuit of the DTIC 302 generates the clock signal 602 provided at pin 5.

The diagram 600 also includes a PWM signal 606. The beginning of each time period TP of the PWM signal 606 is triggered by the clock signal 602. Additionally, each time period TP of the PWM signal 606 is defined by a shunting phase 608 followed by a charging phase 610.

The diagram 600 further includes a storage battery voltage signal (battery signal) 612. The battery signal 612 is depicted as a step-wise rise in voltage over time, with each step occurring contemporaneous with a respective clock pulse 604, for the sake of simplicity and clarity. However, the present teachings contemplate any number of operating scenarios wherein the voltage of a storage battery varies in accordance with any number of signal patterns. As depicted, the battery signal 612 step changes over time from about 13.0 volts DC to about 14.1 volts DC.

The duty cycle of the PWM signal 606 corresponds to the present value of the battery signal 612. For example, the duty cycle of the PWM signal 606 is about twenty-five percent while the battery signal 612 is about 13.3 volts DC. In another example, the duty cycle of the PWM signal 606 is about seventy-five percent while the battery signal is about 13.85 volts DC. Other duty cycle/battery signal correspondences can also be used.

In general and without limitation, the present teachings contemplate solar-power storage battery charge controllers and their operations. A charge controller is configured to receive electrical energy from a solar panel (or array of panels) and to regulate a transfer of such electrical energy to a storage battery (or batteries). The charge controller includes an integrated circuit including two respective timer circuit functions. Alternatively, two distinct integrated circuits each defining a timer function can also be provided.

A first timer circuit monitors a time-varying signal across a capacitor of a timing network and provides a series of regularly spaced clock pulses. The first timer circuit also serves to discharge the capacitor contemporaneous with each clock pulse. Thus, the time-varying voltage across the capacitor increases and decreases back and forth between a lesser threshold voltage and a greater threshold voltage. The sequence of clock pulses defines a succession of time periods.

A second timer circuit is triggered by the clock pulses issued from the first timer circuit. The second timer circuit provides a pulse-width modulated (PWM) signal. Each time period of the PWM signal is defined by an initial shunting phase followed by a charging phase. The duty cycle of the PWM signal is determined by way of comparing the time-varying signal and a voltage derived from the storage battery voltage. In particular, the shunting phase of each time period increases as the storage battery voltage increases.

The PWM signal is used to control or bias a shunting element or switch, such as a power MOSFET transistor. The shunting element is biased electrically conductive or "on" so as to shunt electrical current back to the source solar panel during each shunting phase. Conversely, the shunting element is biased electrically non-conductive or "off" so as to allow electrical current to charge the storage battery during each charging phase.

Electrical current flows from the solar panel through a diode to the storage battery during charging phases. The diode also electrically isolates the storage battery and a portion of the charge controller from the solar panel during shunting phases. The diode further prevents (or nearly so) electrical current from flowing "backwards" from the storage battery to the solar panel. Indicator circuitry is configured to illuminate an LED in response to electrical current through the diode during charging phases.

Charge controllers according to the present teachings do not require nor include any device, element or electronic component that operates in accordance with a machine-readable program code. Thus, no microprocessor, microcontroller or the like, nor corresponding program code (i.e., software or firmware), is contemplated. Additionally, charge controllers according to the present teachings operate without need for Internet access, Internet resources or periodic updates, user password entry, or the like.

The foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

Furthermore, specific circuits having specific component models and/or values have been described. It is to be understood that other circuit component values and/or make/model designations can also be used in accordance with the present teachings. Thus, the present teachings contemplate the use of other suitable components having respectively varying electrical characteristics.

What is claimed is:

1. An electronic circuit, comprising:
    a first resistor and a second resistor and a capacitor connected in series circuit arrangement and configured to provide a time-varying signal;
    a zener diode and a third resistor connected in series circuit arrangement and configured to provide a voltage signal corresponding to a battery voltage present at an output node;
    first timer circuitry configured to provide clock pulses;
    second timer circuitry configured to provide a pulse width modulated signal by way of comparing the voltage signal to the time-varying signal, the second timer circuitry triggered by the clock pulses;
    a switching element configured to shunt an input node to a ground node in accordance with the pulse-width modulated signal; and
    a potentiometer coupled to the first timer circuitry, the first timer circuitry configured to provide the clock pulses in accordance with swings in the time-varying signal between a lesser threshold voltage and a greater threshold voltage, at least the greater threshold voltage being adjustable by way of the potentiometer.

2. The electronic circuit according to claim 1, the first timer circuitry configured to sense the time-varying signal and to discharge the capacitor from a greater threshold voltage to a lesser threshold voltage by way of the second resistor.

3. The electronic circuit according to claim 1, the capacitor configured to charge from a lesser threshold voltage to a greater threshold voltage by way of the first and second resistors.

4. The electronic circuit according to claim 1 further comprising a diode connected between the input node and the output node.

5. The electronic circuit according to claim 4 further comprising indicator circuitry configured to provide a visual signal in response to current flow through the diode.

6. The electronic circuit according to claim 5, the indicator circuitry including a light-emitting diode.

7. The electronic circuit according to claim 1 further comprising a voltage regulator configured to provide a constant voltage by way of a battery voltage present at the output node, the constant voltage being coupled to the first timer circuitry and the second timer circuitry.

8. The electronic circuit according to claim 1, the switching element including a power metal-oxide semiconductor field-effect transistor (MOSFET).

9. The electronic circuit according to claim 1, the first timer circuitry and the second timer circuitry defined by respective portions of a single integrated circuit.

10. The electronic circuit according to claim 1, the first timer circuitry and the second timer circuitry defined by respective integrated circuits.

* * * * *